(12) United States Patent
Raman et al.

(10) Patent No.: US 9,529,643 B2
(45) Date of Patent: Dec. 27, 2016

(54) METHOD AND SYSTEM FOR ACCELERATING TASK CONTROL FLOW

(71) Applicant: QUALCOMM Incorporated, San Diego, CA (US)

(72) Inventors: Arun Raman, Santa Clara, CA (US); Behnam Robatmili, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/604,845

(22) Filed: Jan. 26, 2015

(65) Prior Publication Data

US 2016/0217016 A1 Jul. 28, 2016

(51) Int. Cl.
G06F 9/46 (2006.01)
G06F 9/52 (2006.01)
G06F 9/48 (2006.01)

(52) U.S. Cl.
CPC .............. *G06F 9/52* (2013.01); *G06F 9/4806* (2013.01); *G06F 9/4881* (2013.01)

(58) Field of Classification Search
None
See application file for complete search history.

(56) References Cited

U.S. PATENT DOCUMENTS

| 5,168,566 | A | 12/1992 | Kuki et al. |
| 6,272,518 | B1 * | 8/2001 | Blazo ................. G06F 9/45537 718/100 |
| 7,503,039 | B2 | 3/2009 | Ohara et al. |
| 8,359,588 | B2 | 1/2013 | Reid |
| 8,468,539 | B2 | 6/2013 | Eichenberger et al. |
| 2011/0276966 | A1 | 11/2011 | Christensen et al. |
| 2011/0276979 | A1 * | 11/2011 | Isani ....................... G01S 19/36 718/104 |
| 2011/0321051 | A1 | 12/2011 | Rastogi |

(Continued)

FOREIGN PATENT DOCUMENTS

WO 2010001353 A1 1/2010

OTHER PUBLICATIONS

International Search Report and Written Opinion—PCT/US2015/066422—ISA/EPO—Mar. 14, 2016.

*Primary Examiner* — Van Nguyen
*Assistant Examiner* — Melissa Alfred
(74) *Attorney, Agent, or Firm* — The Marbury Law Group, PLLC

(57) ABSTRACT

A computing device (e.g., a mobile computing device, etc.) may be configured to may be configured to better exploit the concurrency and parallelism enabled by modern multiprocessor architectures by identifying a sequence of tasks via a task dependency controller, commencing execution of a first task in the sequence of tasks, and setting a value of a register so that each remaining task in the sequence of tasks executes after its predecessor task finishes execution without transferring control to a runtime system of the computing device. The task dependency controller may be a hardware component that is shared by the processor cores and/or otherwise configured to transfer control between tasks executing on different processor cores independent of the runtime system and/or without performing the relatively slow and memory-based inter-task, inter-thread or inter-process communications required by conventional solutions.

18 Claims, 12 Drawing Sheets

(56) References Cited

U.S. PATENT DOCUMENTS

2012/0239904 A1* 9/2012 Ekanadham ........ G06F 9/30043
                                                        711/207
2014/0337389 A1   11/2014 Ricketts et al.
2014/0366037 A1   12/2014 Berretta et al.

* cited by examiner

METHOD AND SYSTEM FOR ACCELERATING TASK CONTROL FLOW

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile electronic devices (e.g., cellular phones, watches, headphones, remote controls, etc.) have become more complex than ever, and now commonly include multiple processors, system-on-chips (SoCs), and other resources that allow mobile device users to execute complex and power intensive application programs (e.g., video streaming, video processing, etc.) on their mobile devices.

Due to these and other improvements, smartphones and tablet computers have grown in popularity, and are replacing laptops and desktop machines as the platform of choice for many users. As mobile devices continue to grow in popularity, improved processing solutions that better utilize the multiprocessing capabilities of the mobile devices will be desirable to consumers.

SUMMARY

The various embodiments include methods of executing tasks in a computing device, which may include identifying a sequence of tasks via a task dependency controller of the computing device, commencing execution of a first task in the sequence of tasks, and setting a value of a register so that each remaining task in the sequence of tasks executes after its predecessor task finishes execution without transferring control to a runtime system of the computing device. In an embodiment, identifying the sequence of tasks via the task dependency controller of the computing device may include identifying the sequence of tasks via a hardware-based task dependency controller. In a further embodiment, the hardware-based task dependency controller may be a hardware component shared among a plurality of processor cores executing the sequence of tasks.

In a further embodiment, identifying the sequence of tasks via the task dependency controller of the computing device may include the task dependency controller identifying tasks that depend on one predecessor task, have one dependent successor task, or both. In a further embodiment, setting the value of the register so that each remaining task in the sequence of tasks executes after its predecessor task finishes execution may include setting one of a program counter and a dedicated processor front-end register. In a further embodiment, identifying the sequence of tasks via the task dependency controller of the computing device may include the task dependency controller adding a record to a table implemented in hardware. In a further embodiment, controller of the computing device may include the task dependency controller adding a record that identifies a predecessor task, a successor task, and a program counter of the successor task to a map structure. In a further embodiment, the task dependency controller adding the record to the map structure may include the task dependency controller adding the record to one of an associative map structure and a direct map structure.

Further embodiments may include a computing device that includes a processor configured with processor-executable instructions to perform operations that may include identifying a sequence of tasks via a task dependency controller, commencing execution of a first task in the sequence of tasks, and setting a value of a register so that each remaining task in the sequence of tasks executes after its predecessor task finishes execution without transferring control to a runtime system. In an embodiment, the task dependency controller is a hardware-based task dependency controller. In a further embodiment, the hardware-based task dependency controller is shared among a plurality of processor cores executing the sequence of tasks.

In a further embodiment, the processor may be configured with processor-executable instructions such that identifying the sequence of tasks via the task dependency controller includes the task dependency controller identifying tasks that depended on one predecessor task, have one dependent successor task, or both. In a further embodiment, the processor may be configured with processor-executable instructions such that setting the value of the register includes setting one of a program counter and a dedicated processor front-end register so that each remaining task in the sequence of tasks executes after its predecessor task finishes execution. In a further embodiment, the processor may be configured with processor-executable instructions such that identifying the sequence of tasks via the task dependency controller includes the task dependency controller adding a record to a table implemented in hardware. In a further embodiment, the processor may be configured with processor-executable instructions such that identifying the sequence of tasks via the task dependency controller includes causing the task dependency controller to add a record that identifies a predecessor task, a successor task, and a program counter of the successor task to a map structure selected from a group including an associative map structure and a direct map structure.

Further embodiments include a non-transitory computer readable storage medium having stored thereon processor-executable software instructions configured to cause a computing device processor to perform operations including identifying a sequence of tasks via a task dependency controller, commencing execution of a first task in the sequence of tasks, and setting a value of a register so that each remaining task in the sequence of tasks executes after its predecessor task finishes execution without transferring control to a runtime system. In an embodiment, the stored processor-executable software instructions may be configured to cause a processor to perform operations such that identifying the sequence of tasks via the task dependency controller includes identifying the sequence of tasks via a hardware-based task dependency controller. In a further embodiment, the stored processor-executable software instructions may be configured to cause a processor to perform operations such that identifying the sequence of tasks via the hardware-based task dependency controller includes identifying the sequence of tasks via a hardware component shared by a plurality of processor cores executing the sequence of tasks.

In a further embodiment, the stored processor-executable software instructions may be configured to cause a processor to perform operations such that identifying the sequence of tasks via the task dependency controller includes the task dependency controller identifying tasks that depended on one predecessor task, have one dependent successor task, or both. In a further embodiment, the stored processor-executable software instructions may be configured to cause a processor to perform operations such that setting the value of the register so that each remaining task in the sequence of tasks executes after its predecessor task finishes execution includes setting one of a program counter and a dedicated processor front-end register. In a further embodiment, the stored processor-executable software instructions may be configured to cause a processor to perform operations such that identifying the sequence of tasks via the task dependency controller includes adding a record to a table implemented in hardware. In a further embodiment, the stored processor-executable software instructions may be configured to cause a processor to perform operations such that identifying the sequence of tasks via the task dependency controller includes adding a record that identifies a predecessor task, a successor task, and a program counter of the successor task to one of an associative map structure and a direct map structure.

Further embodiments may include a computing device that includes means for identifying a sequence of tasks via a task dependency controller, means for commencing execution of a first task in the sequence of tasks, and means for setting a value of a register so that each remaining task in the sequence of tasks executes after its predecessor task finishes execution without transferring control to a runtime system. In an embodiment, means for identifying the sequence of tasks via the task dependency controller may include means for identifying the sequence of tasks via a hardware-based task dependency controller. In a further embodiment, means for identifying the sequence of tasks via the hardware-based task dependency controller may include means for identifying the sequence of tasks via a hardware component that is shared by a plurality of processor cores that execute the sequence of tasks.

In a further embodiment, means for identifying the sequence of tasks via the task dependency controller may include means for identifying tasks that depended on one predecessor task, have one dependent successor task, or both. In a further embodiment, means for setting the value of the register so that each remaining task in the sequence of tasks executes after its predecessor task finishes execution may include means for setting one of a program counter and a dedicated processor front-end register. In a further embodiment, means for identifying the sequence of tasks via the task dependency controller may include means for adding a record to a table implemented in hardware. In a further embodiment, means for identifying the sequence of tasks via the task dependency controller may include means for adding a record that identifies a predecessor task, a successor task, and a program counter of the successor task to a map structure. In a further embodiment, means for adding the record to the map structure may include means for adding the record to one of an associative map structure and a direct map structure.

BRIEF DESCRIPTION OF THE DRAWINGS

The accompanying drawings, which are incorporated herein and constitute part of this specification, illustrate exemplary embodiment of the invention, and together with the general description given above and the detailed description given below, serve to explain the features of the invention.

DETAILED DESCRIPTION

Figure 1:
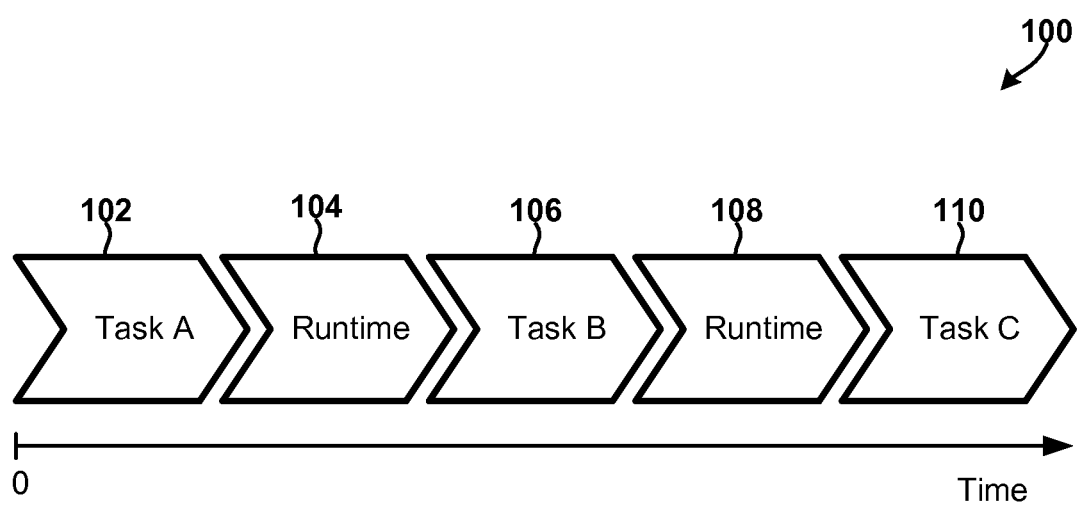
FIG. 1 is a sequence diagram illustrating a prior art method of executing multiple tasks in a computing device.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

For ease of reference, the various embodiments are described below with reference to "tasks" and the "task-parallel programming model." However, it should be understood that any operation described with reference to a "task" may also be performed by a thread or any other structure, construct, or representation in any concurrent programming system that includes blocking. As such, nothing in this application should be used to limit claims to tasks, threads, task-parallel programming, or any other system or technology, unless expressly recited as such in the claims.

In overview, the various embodiments include methods, and computing devices configured to perform the methods, that exploit the concurrency and parallelism enabled by modern multiprocessor architectures to generate and execute application programs in order to achieve fast response times, high performance, and high user interface responsiveness. A computing device (e.g., a mobile computing device, etc.) may be configured to generate and execute a sequence of tasks, and use a task dependency controller to accelerate the transfer of a control flow from one task to another task. The task dependency controller may be implemented in hardware and shared by multiple cores and/or processors of the device. In an embodiment, the device processor and/or task dependency controller may be configured to identify a sequence of tasks, add records that each identify a predecessor task, a successor task, and a program counter of the successor task to a hardware-based table, and set values of select registers (e.g., program counter, dedicated processor front-end register, etc.) so that each task in the identified sequence automatically executes after its predecessor task finishes execution (i.e., without transferring control to the runtime system). As such, the task dependency controller may be used to transfer control between tasks executing on different processors/cores independent of the runtime system and/or without performing the relatively slow and memory-based inter-task, inter-thread or inter-process communications required by conventional solutions.

Said another way, the task dependency controller allows the computing device to forgo the standard or conventional operations for scheduling, executing, performing, and/or managing a sequence of tasks. As a result, implementing and using the task dependency controller and hardware-based table in accordance with the various embodiments decreases the performance latencies associated with executing a sequence of tasks in parallel, reduces or eliminates instruction cache pollution arising out of incorrect branch prediction, eliminates processor or CPU cycles wasted in the processor pipeline while waiting for instructions to be fetched owing to incorrectly predicted control flow transfer, and/or allows the computing device to avoid performing operations for an incorrectly predicted control flow path. For these and other reasons, the inclusion and use of the task dependency controller and hardware-based table in a computing device configured in accordance with the various embodiments improves the device's efficiency, performance and power-consumption characteristics.

The various embodiments improve the functioning of the computing device for the reasons described above. Additional improvements to the functions, functionalities, and/or functioning of computing devices will be evident from the detailed descriptions of the embodiments provided below.

The terms "computing system" and "computing device" are used generically herein to refer to any one or all of servers, personal computers, and mobile computing devices, such as cellular telephones, smartphones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar personal electronic devices which include a programmable processor. While the various embodiments are particularly useful in mobile computing devices, such as smartphones, which have limited processing power and battery life, the embodiments are generally useful in any computing device that includes a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips or substrates. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile computing device. The proximity of the SOCs facilitates high speed communications and the sharing of memory and resources.

The term "multicore processor" is used herein to refer to a single integrated circuit (IC) chip or chip package that contains two or more independent processing cores (e.g., CPU core, IP core, GPU core, etc.) configured to read and execute program instructions. A SOC may include multiple multicore processors, and each processor in an SOC may be referred to as a core. The term "multiprocessor" is used herein to refer to a system or device that includes two or more processing units configured to read and execute program instructions.

The terms "program counter," "instruction pointer," and "instruction address register" may be used interchangeably herein, and are used to refer to a value of a register used by a processor to identify the memory address of the next execution instruction. Said another way, the program counter "points to" the next instruction that is to be executed by the processor. The instructions are typically fetched sequentially from memory, and the program counter is incremented after each fetch operation. A "control transfer" instruction changes this sequence by inserting new value (i.e., a new memory location) into the register so that the next instruction is fetched from a different memory location.

The term "runtime system" is used herein to refer to a combination of resources in a computing device that support the execution of an application program in that device. For example, a runtime system may include all or portions of the computing device's processing resources, operating systems, library modules, schedulers, processes, threads, stacks, counters, and/or other similar components. A runtime system may be responsible for allocating computational resources to an application program, for controlling the allocated resources, and for performing the operations of the application program.

A parallel programming runtime system is a runtime system that supports concurrent/parallel execution of all or portions of one or more application programs. Modern parallel programming runtime systems allow software designers to create high-performance parallel application programs that better exploit the concurrency and/or parallelism capabilities of modern processor architectures. A software designer may specify the portions of an application program that are to be executed (such as a programmer-specified C/C++ function) by the parallel programming runtime system. The runtime system may execute or perform the portions in one or more hardware processing units (e.g., processor, a processing core, etc.) via processes, threads, or tasks.

A process may be a software representation of an application program in a computing device. Processes may be executed on a processor in short time slices so that it appears that multiple application programs are running simultaneously on the same processor (e.g., by using time-division multiplexing techniques), such as a single-core processor. When a process is removed from a processor at the end of a time slice, information pertaining to the current operating state of the process (i.e., the process's operational state data) is stored in memory so the process may seamlessly resume its operations when it returns to execution on the processor.

A process's operational state data may include the process's address space, stack space, virtual address space, register set image (e.g. program counter, stack pointer, instruction register, program status word, etc.), accounting information, permissions, access restrictions, and state information. The state information may identify whether the process is in a running state, a ready or ready-to-run state, or a blocked state. A process is in the ready-to-run state when all of its dependencies or prerequisites for execution have been met (e.g., memory and resources are available, etc.), and is waiting to be assigned to the next available processing unit. A process is in the running state when its procedure is being executed by a processing unit. A process is in the blocked state when it is waiting for the occurrence of an event (e.g., input/output completion event, etc.).

A process may spawn other processes, and the spawned process (i.e., a child process) may inherit some of the permissions and access restrictions (i.e., context) of the spawning process (i.e., the parent process). A process may also be a heavy-weight process that includes multiple light-weight processes or threads, which are processes that share all or portions of their context (e.g., address space, stack, permissions and/or access restrictions, etc.) with other processes/threads. Thus, a single process may include multiple threads that share, have access to, and/or operate within a single context (e.g., a processor, process, or application program's context).

A multiprocessor system may be configured to execute multiple threads concurrently or in parallel to improve a process's overall execution time. In addition, an application program, operating system, runtime system, scheduler, or another component in the computing system may be configured to create, destroy, maintain, manage, schedule, or execute threads based on a variety of factors or considerations. For example, to improve parallelism, the system may be configured to create a thread for every sequence of operations that could be performed concurrently with another sequence of operations.

Application programs that maintain a large number of idle threads, or frequently destroy and create new threads, often have a significant negative or user-perceivable impact on the responsiveness, performance, or power consumption characteristics of the computing device. Therefore, an application program may implement or use a task-parallel programming model or solution that provides adequate levels of parallelism without requiring the creation or maintenance of a large number of threads. Such solutions allow the computing system to split the computation of an application program into tasks, assign the tasks to the thread pool that maintains a near-constant number of threads (e.g., one for each processing unit), and execute assigned tasks via the threads of the thread pool. A process scheduler or runtime system of the computing system may schedule tasks for execution on the processing units, similar to how processes and threads may be scheduled for execution.

A task may include any procedure, unit of work, or sequence of operations that may be executed in a processing unit via a thread. A task may include state information that identifies whether the task is launched, ready, blocked, or finished. A task is in the launched state when it has been assigned to a thread pool and is waiting for a predecessor task to finish execution and/or for other dependencies or prerequisites for execution to be met. A task is in the ready state when all of its dependencies or prerequisites for execution have been met (e.g., all of its predecessors have finished execution), and is waiting to be assigned to the next available thread. A task is in the blocked state when it (or its associated thread) is waiting on a dependency to be resolved, a resource to become available, a system call to return, a response to system request, etc. A task may be marked as finished after its procedure has been executed by a thread or after being canceled.

A task may be dependent on other tasks, and each task can execute as soon as all of the tasks on which it depends (predecessor tasks) finish execution. For example, if task C is dependent on tasks A and B, task C may enter the "ready" state as soon as tasks A and B finish execution. The runtime system or task scheduler may then assign the next available thread to the next task that is ready for execution (in this case, task C).

Often, there is a sequence (or chain) of tasks in which each task in the sequence is dependent on only one predecessor task. For example, task C may dependent on only task B, and task B may be dependent only on task A. The runtime system could execute this chain of tasks sequentially (i.e., A→B→C) without performing complex scheduling operations. That is, since task B is dependent only on task A, the device processor could automatically begin executing the procedure of task B immediately after task A finishes execution without causing the system to function improperly.

FIG. 1 illustrates a prior art method 100 for executing a sequence of tasks A, B, and C in a computing device. In block 102, a processing core of the computing device may perform the procedure of task A to completion (i.e., until task A is marked as "finished"). In block 104, the runtime system of the computing device may perform various scheduling or transfer of control flow operations, which may include determining whether task B's dependencies have been resolved. In block 106, the processing core may perform the procedure of task B to completion. In block 108, the runtime system may perform additional scheduling or transfer of control flow operations, such as determining whether task C's dependencies have been resolved. In block 110, the processing core may perform the procedure of task C to completion.

Conventional solutions do not intelligently identify sequences or chains of tasks, and as a result, are required to perform a number of relatively complex and power-intensive scheduling and "transfer of control flow" operations each time a task commences or finishes execution. For example, during normal operation, a conventional runtime system may launch task A, commence executing task A's procedure, determine that task A has finished executing, load task B, determine whether task B dependencies as resolved (e.g., by determining whether all of task B's predecessor tasks have finished execution, etc.), mark task B as "ready" in response to determining that its dependencies as resolved, add task B to the ready queue, and assign a thread to execute the next task in the ready queue. While these operations may be necessary when there are multiple or complex task-dependencies, performing these operations for the above-described sequence or chain of tasks is an inefficient use of the computing device's memory, battery, and processor resources.

Figure 2:
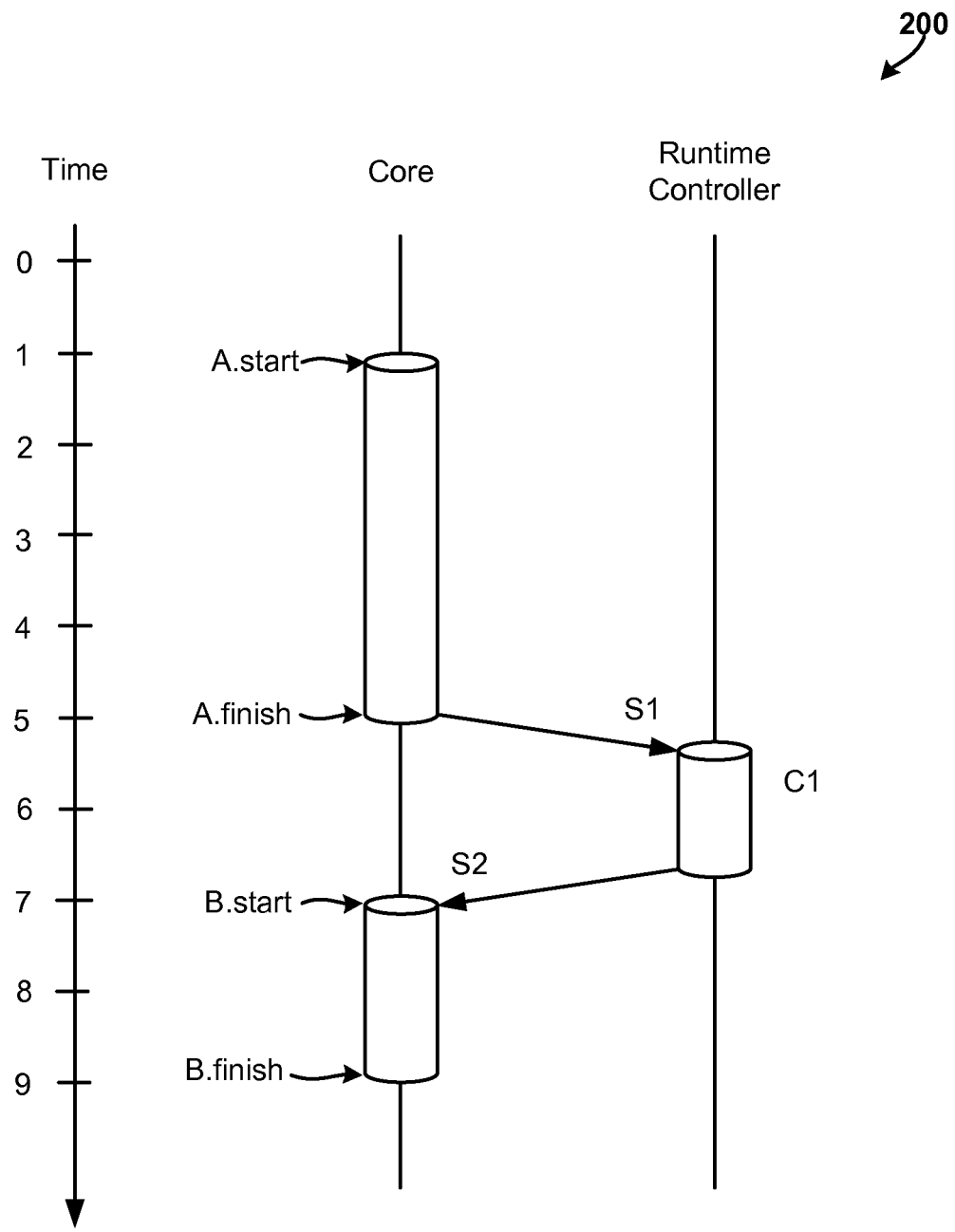
FIG. 2 is a block diagram illustrating the operations and information flows in a computing device configured to execute tasks using a prior art method.

FIG. 2 illustrates a prior art method 200 of executing tasks A and B in a computing device. In the example illustrated in FIG. 2, task A starts executing its procedure via a processing core of the computing device at time 1. At time 5, task A finishes executing its procedure, and sends a first signal (S1) to a runtime controller of the computing device. The runtime controller may be part of the runtime system of the computing device, and responsible for determining whether task dependencies have been resolved. The first signal (S1) may include a task id and a message indicating that task A's execution has finished. In response to receiving the first signal (and its message), the runtime controller may perform a first computation (C1), use the first computation (C1) to identify the tasks that entered the ready state as a result of task A finishing its execution, and identify a ready task that is best suited for execution in the core. In the illustrated example, the runtime controller identifies task B as being the task that is best suited for execution in the core.

In response to identifying task B as best suited for execution in the processing core, the runtime controller may send a second signal (S2) to the processing core. The second signal (S2) may include a task id and a program counter associated with task B. At time 7, task B starts executing its procedure via a processing core of the computing device. At time 9, task B finishes executing its procedure.

The round-trip latency from the initiation of signal S1 to the receipt of signal S2 (i.e., the period between time 5 and time 7) by the core constitutes execution overhead that reduces the performance of the core. In addition to this round-trip latency, method 200 may have a negative impact on the performance and power consumption characteristics for any or all of the reasons discussed above (e.g., wasted CPU cycles, instruction cache pollution, etc.)

The various embodiments overcome the limitations of existing solutions by configuring a computing device to intelligently identify a chain of tasks in which each task is dependent on one predecessor task and/or has one dependent successor task, and forgo performing scheduling or "transfer of control flow" operations when executing the tasks included in an identified chain. This accelerates the transfer of control flow between tasks in a chain (e.g., from task A to task B), and as a result, improves the performance and energy-efficiency of executing a task-parallel program in the computing device. This also improves the functioning of the computing device by allowing it to execute application programs faster and more efficiently.

Figure 3:
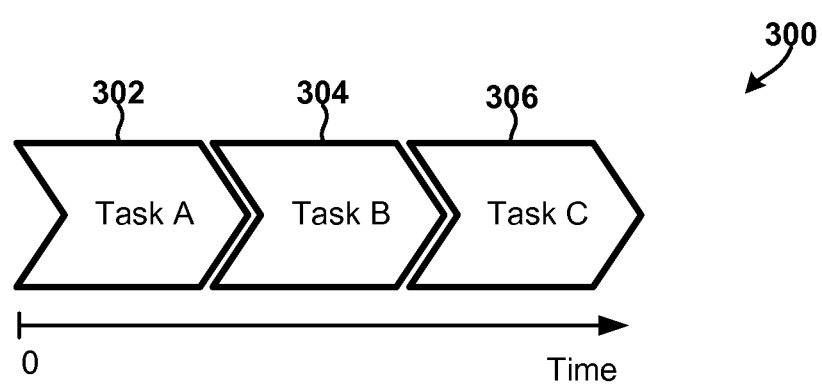
FIG. 3 is a sequence diagram illustrating an embodiment method of executing multiple tasks in a computing device.

FIG. 3 illustrates a method 300 of executing a sequence of tasks (i.e., tasks A, B, and C) in a computing device configured in accordance with the various embodiments. In block 302, a processing core of the computing device may perform the procedure of task A to completion. Almost immediately after task A is marked as finished, the processing core may commence execution of the procedure of task B in block 304. This may be accomplished without performing the relatively complex and power-intensive scheduling and/or transfer of control flow operations (e.g., operations of block 104 illustrated in FIG. 1A, etc.). Similarly, in block 306, the processing core may commence execution of the procedure of task C almost immediately after task B is marked as finished. By eliminating the scheduling and transfer of control operations of the runtime system (e.g., operations of blocks 104 and 108 illustrated in FIG. 1A), the various embodiments improve the performance and power-consumption characteristics of the computing device.

As a further example, consider a chain of tasks A→B→ . . . →Y→Z. An embodiment computing device could control the flow of tasks as follows:

start_pc(A) → ... end_pc(A) → start_pc(B) → ... end_pc(B) →

...

start_pc(Y) → ... end_pc(Y) → start_pc(Z) → ... end_pc(Z)

That is, an embodiment computing device could set the values of the start program counter (start_pc) and end program counter (end_pc) for each task in the sequence (A→B→ . . . →Y→Z) so that the runtime system executes each successor task immediately after its predecessor task finishes execution. The control flows from one task to another without the task runtime system determining whether a task's dependencies have been resolved. This improves the performance and power consumption characteristics of the computing device.

In an embodiment, the computing device may be equipped with a hardware-based task dependency controller (TDC), and the computing device's instruction set architecture (ISA) may be modified to allow a software application to communicate with the task dependency controller. For example, the computing device's instruction set architecture could be modified to support the following instructions:

(I1) id=task_get_id
// Returns a unique id
(I2) success=task_add_dep id_a, id_b, B.pc
// Notify the TDC that a dependence has been added for task A to
// task B, and register the program counter of the first instruction in
// task B. Optionally return a value to indicate whether the task
// dependence was successfully added
(I3) task_start id
// Notify that task with specified id has started execution
(I4) task_finish id
// Notify that task with specified id has finished execution and
//deallocate id In an embodiment, the task dependency controller may include a hardware-based table, which may be implemented as an associative map structure or a direct map structure based on whether the runtime system uses hardware or software to generate, define, and assign task identifiers ("task ids"). For example, the hardware table may be implemented as an associative map structure or a direct map structure in computing systems that define task ids via hardware, and as an associative map structure in computing systems that define task ids via software.

An associative map table may be defined as follows:

TABLE 1

(associative map)

(C1) VALID // is this entry valid?
(C2) PRED // id of task A if A→B
(C3) SUCC // id of task B if A→B
(C4) SUCC_PC // program counter of task B if A->B In the above example, TABLE 1 includes a validity parameter (e.g. VALID), predecessor parameter (e.g., PRED), a successor parameter (e.g., SUCC), and a successor program counter parameter (e.g., SUCC_PC). The validity parameter (e.g. VALID) may include a binary or Boolean value that indicates whether a record is valid. The predecessor parameter (e.g., PRED) may include a value that identifies a predecessor task. The successor parameter (e.g., SUCC) may include a value that identifies a successor task. The successor program counter parameter (e.g., SUCC_PC) may include a value that identifies a location or register that includes the starting instruction of the successor task (e.g., an instruction for launching the successor task, commencing execution of the procedure of the successor task, etc.).

Alternatively, the task dependency controller may implement the hardware table as a direct map, and use the "task id" of the predecessor task as an index into the direct map. For example, the task dependency controller may include hardware table that is defined as follows:

TABLE 2

(direct map)

(C1) VALID // is this entry valid?
(C2) SUCC // id of task B if A→B
(C3) SUCC_PC // program counter of task B if A→B
Row index to access map entry // id of task A if A→B An application developer or compiler of the computing device may insert any or all the above-describes instruction set architecture instructions (e.g., instructions I1-I4) in the execution path of a software application that implements a task-parallel programming model. Such a software application could include the following example source code:

(1) A=create_task([ ]
  {id_a=getid( ); task_start id_a; . . . task_finish id_a;})
(2) B=create_task([ ]
  {id_b=getid( ); task_start id_b; . . . task_finish id_b;})
(3) C=create_task([ ]
  {id_c=getid( ); task_start id_c; . . . task_finish id_c;})
(4) add_dependence(A, B)
(5) A.id=task_get_id
(6) B.id=task_get_id
(7) task_add_dep A.id, B.id, B.pc
(8) add_dependence(A, B)
(9) C.id=task_get_id
(10) task_add_dep B.id, C.id, C.pc
(11) launch(C)
(12) launch(B)
(13) launch(A)

With reference to the example above, when the device processor executes operation 7 (i.e., "task_add_dep A.id, B.id, B.pc"), the task dependency controller generates, adds, or allocates a record of the table (e.g., Table 1) for that dependency relationship. Such a record may include an identifier predecessor task (i.e., "PRED=id_a"), an identifier of a successor task (i.e., "SUCC=id_b"), and the memory location of the first instruction of the successor task (i.e., "SUCC_PC=B.pc" or "SUCC_PC=0xd00b105").

When the device processor performs instruction I3 (i.e., task_start id) to launch a task (e.g., task A), the task dependency controller queries the table for a record that identifies that task as a predecessor task (i.e., "PRED=id_a"). The task dependency controller may then inform the instruction prefetcher and/or branch predictor of the intent to branch (or perform a "control transfer") to the location/instruction identified by program counter parameter (SUCC_PC). This will cause the processor to execute successor task (e.g., task B) after completing the procedure of the current task (e.g., task A).

In another embodiment, the value of the successor program counter parameter (SUCC_PC) may be written to a register in the processor front-end so that when instruction I4 (i.e., task_finish id) is executed or performed, the control flow jumps directly to the location identified by that register. In an embodiment, the computing device may be equipped with a register that is used explicitly and expressly for these purposes (e.g., for direct control flow jumps to a memory/instruction location associate with a successor task).

If task B has multiple predecessor tasks (e.g., A→B and D→B), it may not be operationally correct for the device processor to commence execution of task B after performing instruction I4 (i.e., task_finish id) for task A. This is because task B depends on other tasks (e.g., task D) that may not have finished executing when instruction I4 (i.e., task_finish id) is performed. To overcome this, when a dependence relationship is added to the table (e.g., via instruction I2), the task dependency controller may query the table to determine whether any of the records identify the current task (e.g., task B) as a successor task (e.g., "SUCC=id_b"). In response to determining that the table includes a record that identifies the current task as a successor task (e.g., "SUCC=id_b"), the task dependency controller may delete the record from the hardware table and/or set the value of the validity parameter for that record to "false" (e.g. "VALID=0").

Similarly, if task A has multiple successor tasks (e.g., A→B and A→D), it may not be operationally correct to signal that all of these successor tasks may begin executing after instruction I4 (i.e., task_finish id) is performed. To overcome this, when a dependence relationship is added to the table (e.g., via instruction I2), the task dependency controller may query the table to determine whether any of the records identify the current task as its predecessor (e.g., "PRED=id_a"). In response to determining that the table includes a record that identifies the current task as a predecessor task (e.g., "PRED=id_a"), the task dependency controller may delete the record from the hardware table and/or set the value of the validity parameter for that record to "false" (e.g. "VALID=0").

By performing the above operations, the computing device may identify a chain of tasks by determining whether each task includes a single successor task and/or a single processor task. This allows the computing device to perform chains of tasks sequentially, and intelligently determine whether to forgo performing conventional operations when transferring control between tasks. Said another way, the computing device may "short-circuit" the control flow when transitioning from a first task (e.g., task A) to a second task (e.g., task B) when the first and second tasks belong to a sequence or chain of tasks, and use conventional solutions when the first and second tasks do not belong to the same sequence or chain of tasks. This ensures correct operation of the software application, and improves the performance and power consumption characteristics of the computing device.

By using a task dependency controller that is implemented in hardware that is shared by multiple processing cores and a hardware-based table (e.g., a table or map structure implemented via hardware), the computing device may improve the performance and efficiency of the queries to the task dependency controller (i.e., relative to conventional solutions in which the task dependency controller is mostly part of the runtime code running on one of the system's cores, which requires that tasks running on different cores communicate via a shared memory).

Figure 4:
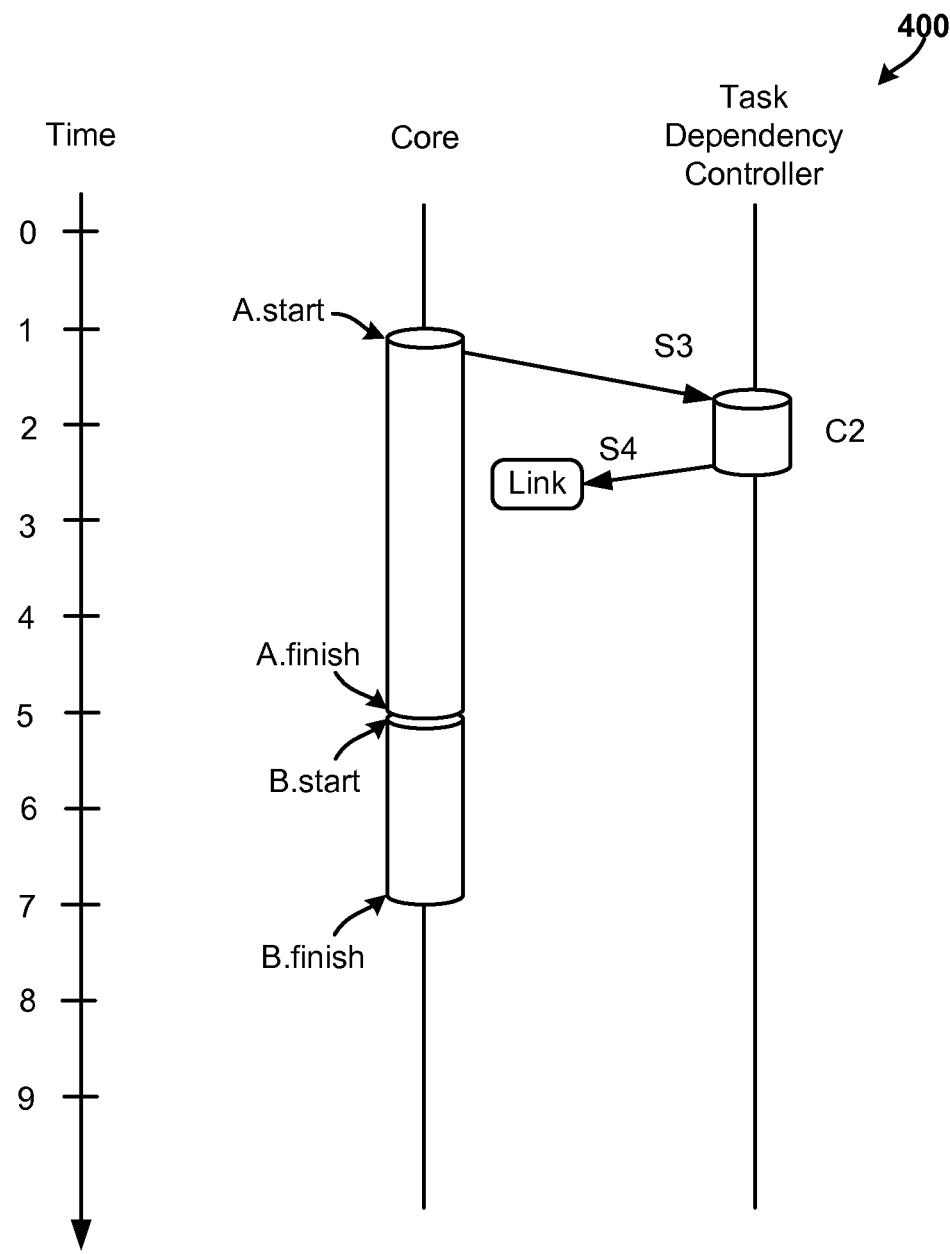
FIGS. 4-6 are block diagrams illustrating the operations and information flows in computing devices configured to execute tasks using embodiment methods.

FIG. 4 illustrates a method 400 of executing tasks A and B in a computing device in accordance with an embodiment. In the example illustrated in FIG. 4, task A starts executing its procedure via a processing core of the computing device at time 1. Also at time 1, task A sends a signal (S3) to the task dependency controller. This signal (S3) may include a task id and a message (e.g., a single bit, etc.) indicating that task A has commenced execution of its procedure. After sending the signal (S3), the core may continue executing the procedure of task A without waiting for a response from the task dependency controller.

In response to receiving the signal S3, the task dependency controller may perform a reduced computation (C2), such as a lookup in a hardware table, to determine the program counter of the next task to be executed by the core. The task dependency controller may perform reduced computation C2 concurrent or in parallel with the execution of task A in the processing core.

After performing reduced computation C2, the task dependency controller may send another signal (S4) to the core (or another processor or core in the computing device). The signal S4 may include a program counter (e.g., value identified via the hardware table). The computing device may write the program counter value into a "link register" in the core while the core continues executing task A and/or without having significant or negative impact on the performance of the procedure of task A.

Thus, in the example illustrated in FIG. 4, signals S3 and S4 may be generated, processed, and communicated, and reduced computation C2 may be performed, without having a significant or negative impact on the performance of the procedure of task A. As a result, method 400 reduces latency of the operations performed by the core. Further, by the time the core finishes task A, the core already has the program counter of the first instruction in task B available in the link register. This allows the control flow to naturally transfer back to task B, and for task B to commence its execution almost immediately after task A finishes its execution. As a result, task B finishes its execution at time 7 (as opposed to time 9 when performing method 200 illustrated in FIG. 2).

Figure 5:
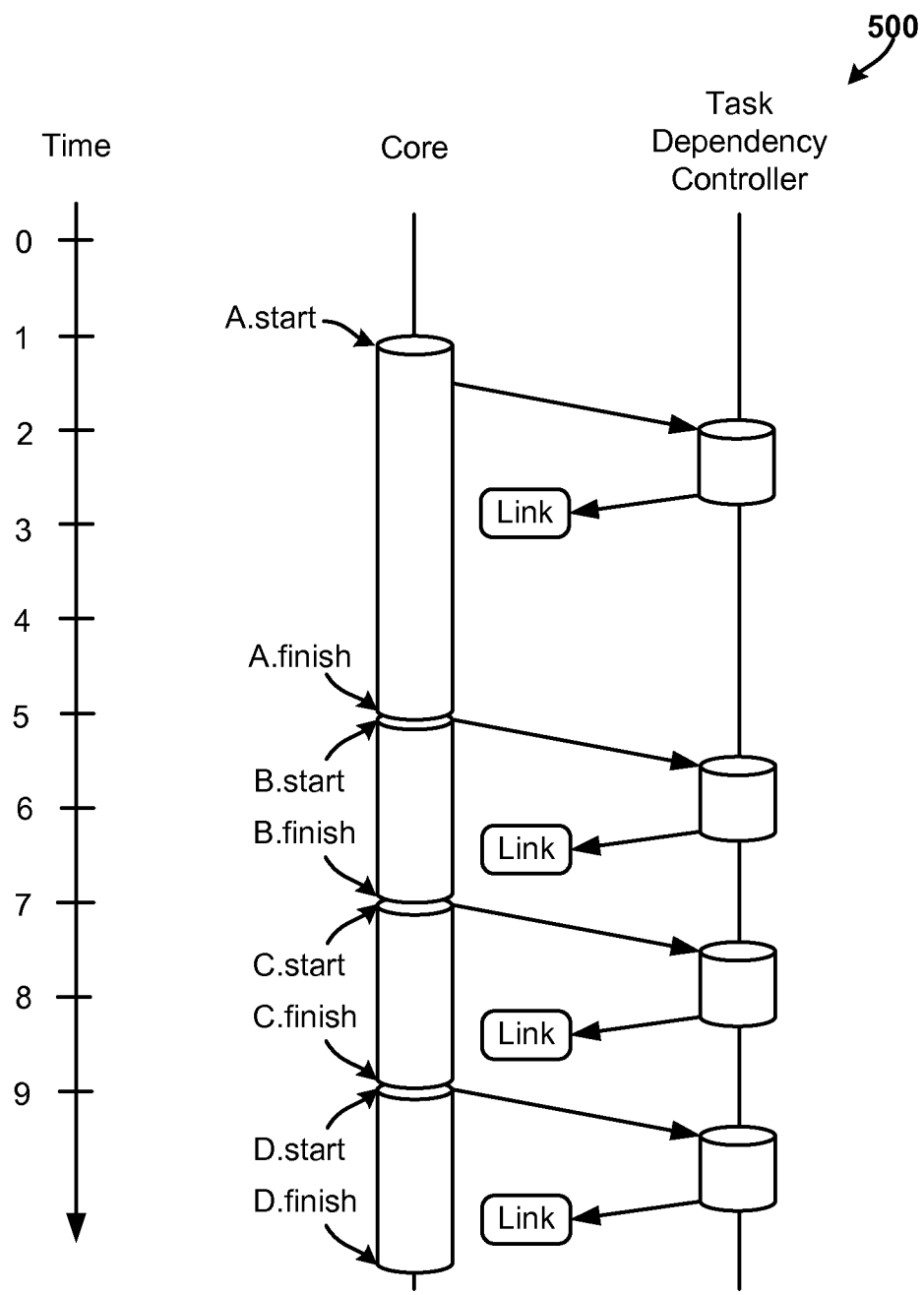
Figure 6:
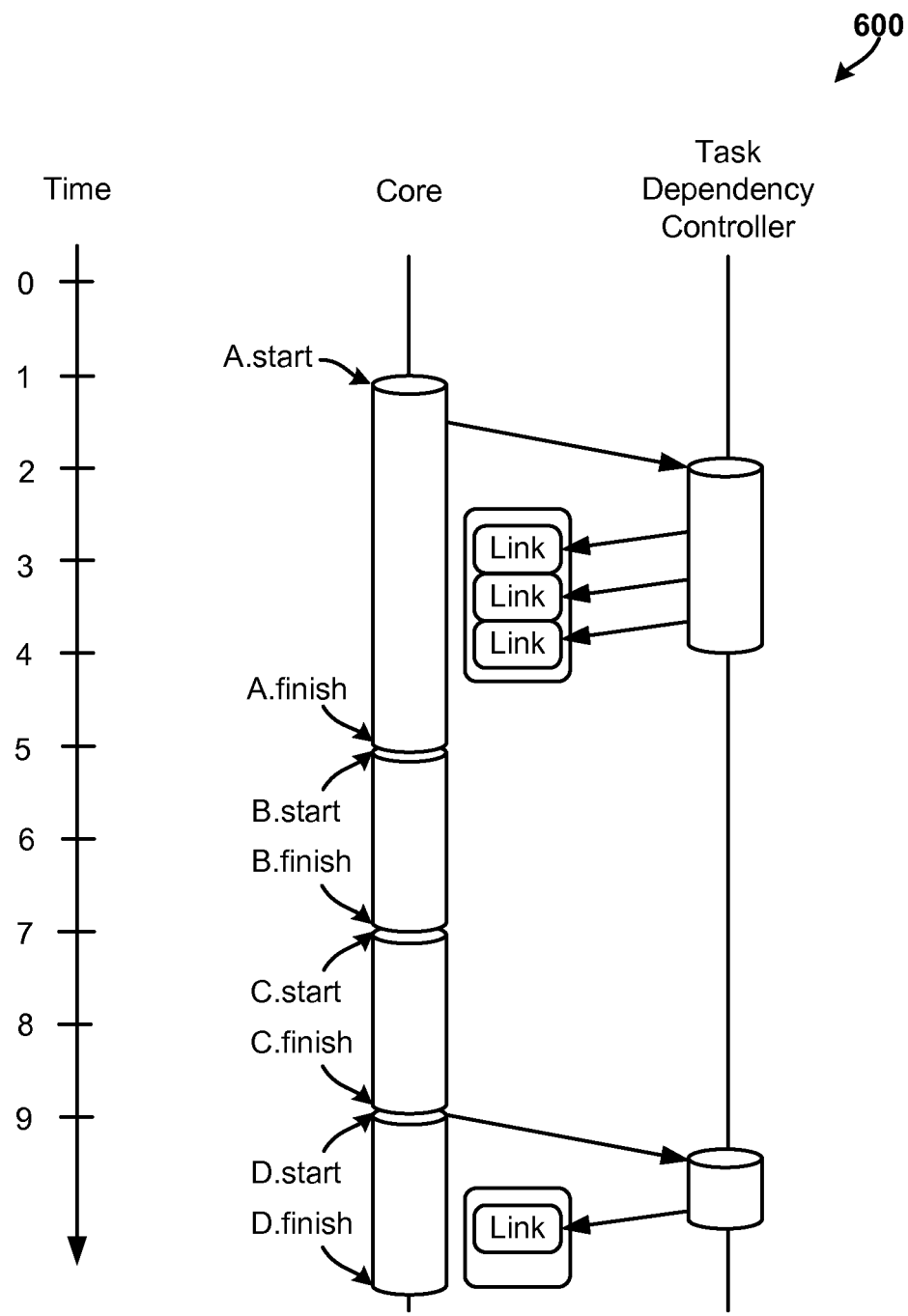

FIGS. 5 and 6 illustrate embodiment methods 500, 600 of executing tasks A and B in a computing device configured to use a single link register and a link array, respectively. A link array may include multiple link registers, and may reduce the amount of signaling required to accelerate a chain of dependent tasks A→B→C→D and allow the task dependency controller to power itself down after processing the whole chain, much before the tasks actually finish executing. As illustrated in FIG. 5, when the task dependency controller receives the signal that task A has started execution, the task dependency controller performs a series of lookups in the hardware table to identify the starting program counters of the next sequence of tasks B, C, D. It then writes the program counters of the tasks it has identified as the successor chain into the link array in sequence. After performing these operations, the task dependency controller may go to sleep to conserve power. On the other hand, in the example illustrated in FIG. 6, the core does not send a signal to the task dependency controller when the next tasks starts execution (e.g., B.start, C.start, etc.) since the transfer of control flow to these tasks was already optimized by the task dependency controller as indicated by the use of the link array values to transfer control. When task D starts execution, its sends a signal to the task dependency controller, which is woken up by the signal.

Figure 7:
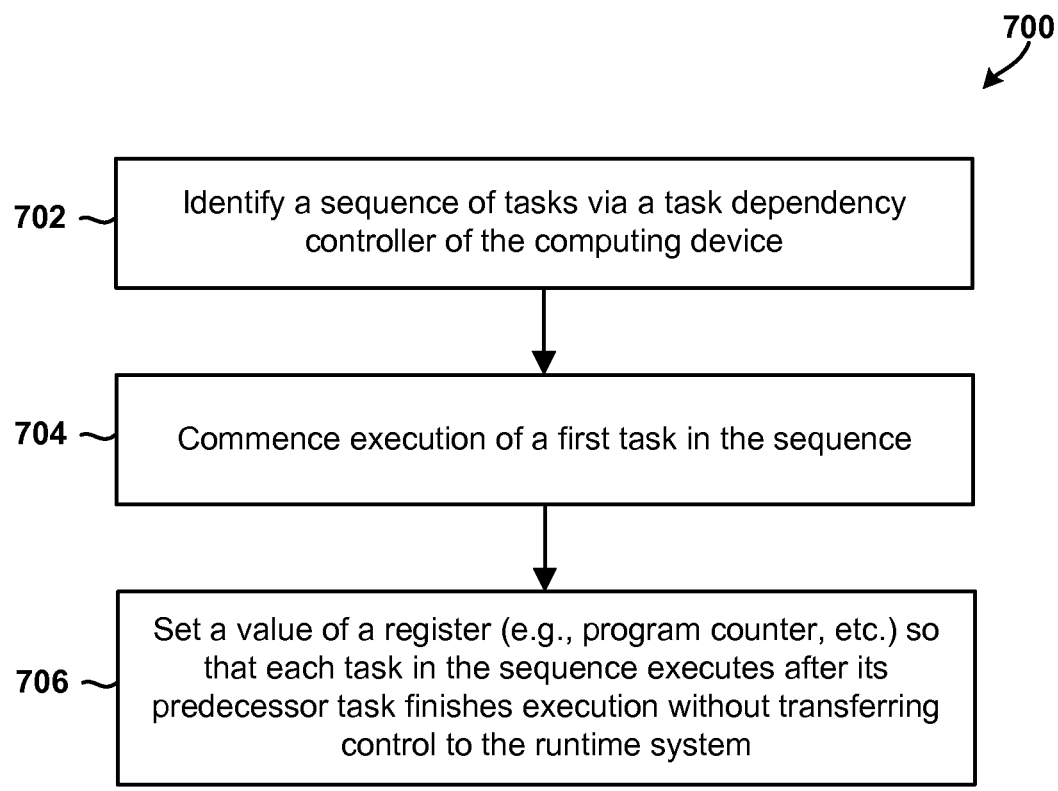
FIG. 7 is a process flow diagram illustrating a method of executing tasks in accordance with an embodiment.

FIG. 7 illustrates a method 700 of executing tasks in accordance with an embodiment. In block 702, a processor of a computing device may identify a sequence of tasks via a hardware-based task dependency controller of the computing device. In block 704, the processor may commence execution of a first task in the sequence. In block 706, the processor may set a value of a register (e.g., program counter) so that each task in the sequence executes after its predecessor task finishes execution without transferring control to the runtime system. In an embodiment, the processor may be configured to perform the operations of block 704 after the operations of 706.

Figure 8:
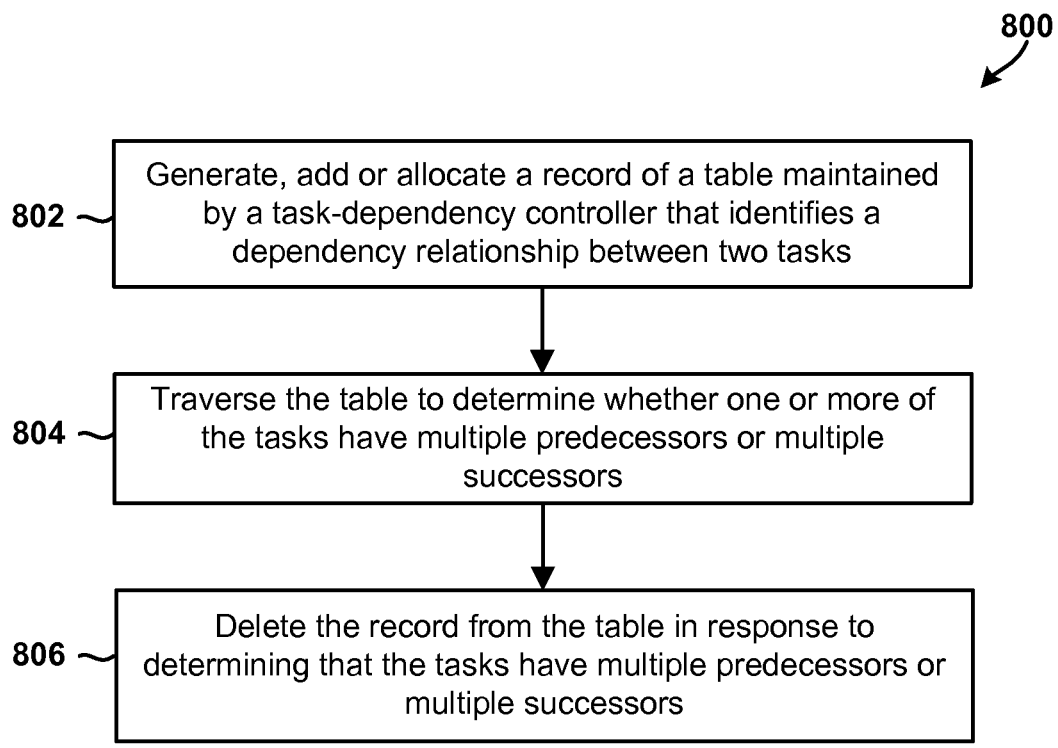
FIG. 8 is a process flow diagram illustrating a task dependency controller method of updating a dependency table in accordance with an embodiment.

FIG. 8 illustrates a method 800 of adding a dependency relationship to a table maintained by a task dependency controller of a computing device. In block 802, a task dependency controller of the computing device may generate, add, and/or allocate a record of the table to identify a dependency relationship between two tasks. The record may identify a predecessor task, a successor task, and a program counter of the successor task. In block 804, the task dependency controller may traverse the table to determine whether one or more of the tasks have multiple predecessors or multiple successors. In block 806, the task dependency controller may delete the record from the table in response to determining that the tasks have multiple predecessors or multiple successors.

Figure 9:
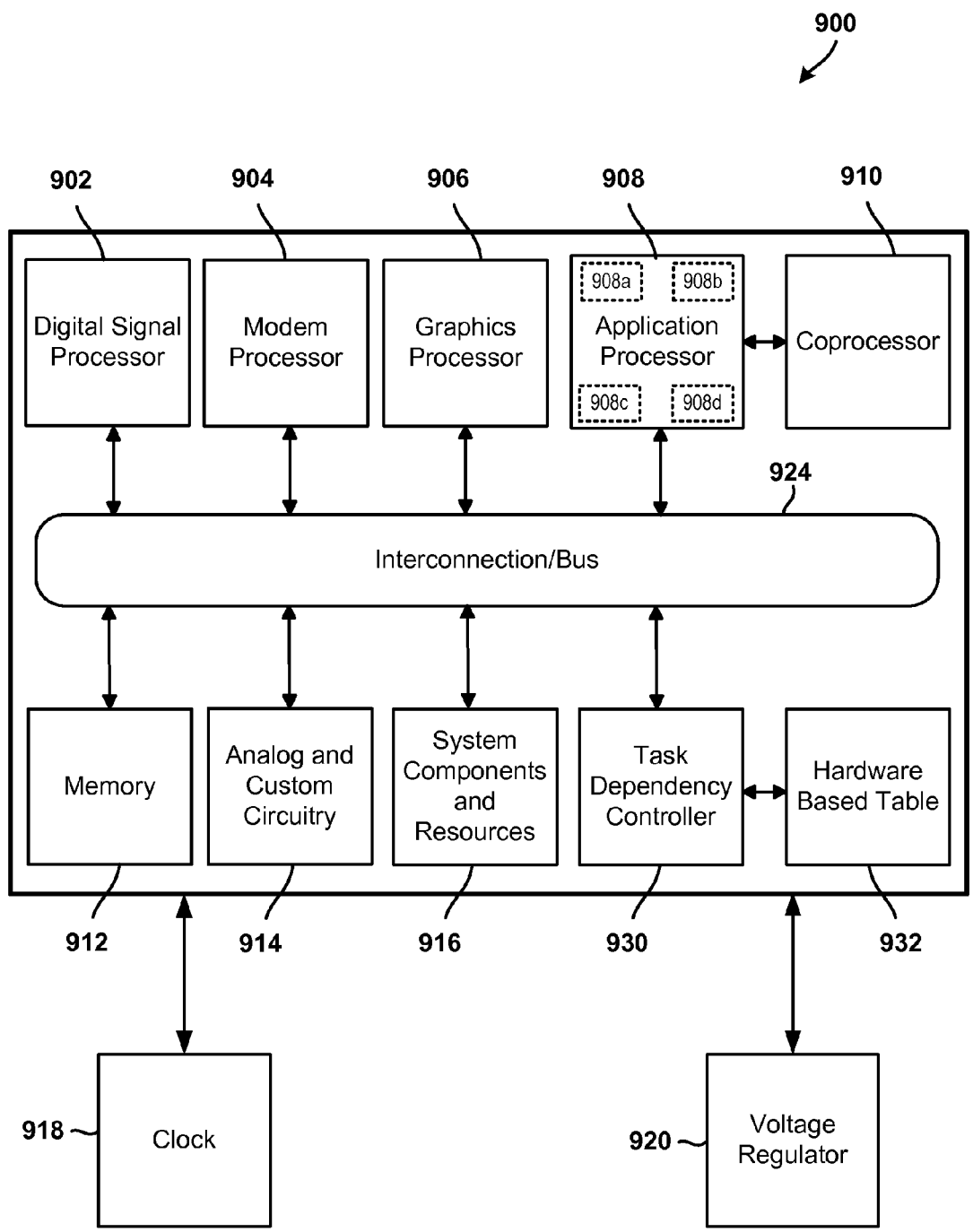
FIG. 9 is an architectural diagram of an example system on chip suitable for implementing the various embodiments.

FIG. 9 illustrates an example system-on-chip (SOC) 900 architecture that may be included in a computing device configured to execute application programs that implement the task-parallel programming model and/or to execute tasks in accordance with the various embodiments. The SOC 900 may include a number of heterogeneous processors, such as a digital signal processor (DSP) 902, a modem processor 904, a graphics processor 906, and an application processor 908. The SOC 900 may also include one or more coprocessors 910 (e.g., vector co-processor) connected to one or more of the heterogeneous processors 902, 904, 906, 908. In an embodiment, the graphics processor 906 may be a graphics processing unit (GPU).

Each processor 902, 904, 906, 908, 910 may include one or more cores (e.g., processing cores 908a, 908b, 908c, and 908d illustrated in the application processor 908), and each processor/core may perform operations independent of the other processors/cores. The SOC 900 may include a processor that executes an operating system (e.g., FreeBSD, LINUX, OS X, Microsoft Windows 10, etc.) which may include a scheduler configured to schedule sequences of instructions, such as threads, processes, or data flows, to one or more processing cores for execution. In an embodiment, the application processor 908 may be a central processing unit (CPU).

The SOC 900 may also include a hardware-based task dependency controller 930 that is implemented in hardware and a hardware-based table 932. The hardware-based task dependency controller 930 may be shared by multiple cores (e.g., processing cores 908a, 908b, 908c, and 908d illustrated in the application processor 908) and/or by multiple processors 902, 904, 906, 908, 910. In some embodiments, the hardware-based task dependency controller 930 and/or hardware-based table 932 may be implemented using logic gates (e.g., an NAND, AND, OR, XOR, AOI, OAI, etc.), which typically include one or more field-effect transistors (FETs) configured or arraigned to implement a Boolean function. The hardware-based task dependency controller 930 and/or hardware-based table 932 may also be implemented using logic circuits that include various hardware components such as relays, valves, transistors, multiplexers, registers, memories, arithmetic logic units (ALUs), processors, etc.

The task dependency controller 930 may be used to forgo the standard operations for scheduling an identified sequence of tasks so as to decrease performance latencies associated with executing the sequence of tasks in parallel on multiple cores. For example, the task dependency controller 930 may identify a sequence of tasks, add records that each identify a predecessor task, a successor task, and a program counter of the successor task to the hardware-based table 932, and set values of select registers (e.g., program counter, dedicated processor front-end register, etc.) so that each task in the identified sequence automatically executes after its predecessor task finishes execution (i.e., without transferring control to the runtime system). This improves the efficiency, performance, and power consumption characteristics of the SOC 900 by eliminating some of the instructions that conventional solutions execute via the runtime system. For example, the task dependency controller 930 may be used to transfer control between tasks executing on different processors/cores without performing the relatively slow and memory-based inter-task, inter-thread, or inter-process communications required by conventional solutions.

The SOC 900 may also include analog circuitry and custom circuitry 914 for managing sensor data, analog-to-digital conversions, wireless data transmissions, and for performing other specialized operations, such as processing encoded audio and video signals for rendering in a web browser. The SOC 900 may further include system components and resources 916, such as voltage regulators, oscillators, phase-locked loops, peripheral bridges, data controllers, memory controllers, system controllers, access ports, timers, and other similar components used to support the processors and software programs running on a computing device.

The system components and resources 916 and/or custom circuitry 914 may include circuitry to interface with peripheral devices, such as cameras, electronic displays, wireless communication devices, external memory chips, etc. The processors 902, 904, 906, 908 may communicate with each other, as well as with one or more memory elements 912, system components and resources 916, custom circuitry 914, and task dependency controller 930 via an interconnection/bus module 924. The interconnection/bus module 924 may include an array of reconfigurable logic gates and/or implement a bus architecture (e.g., CoreConnect, AMBA, etc.). Communications may be provided by advanced interconnects, such as high performance networks-on chip (NoCs).

The SOC 900 may further include an input/output module (not illustrated) for communicating with resources external to the SOC, such as a clock 918 and a voltage regulator 920. Resources external to the SOC (e.g., clock 918, voltage regulator 920) may be shared by two or more of the internal SOC processors/cores (e.g., a DSP 902, modem processor 904, graphics processor 906, application processor 908, etc.).

In addition to the SOC 900 discussed above, the various embodiments (including, but not limited to, embodiments discussed below) may be implemented in a wide variety of computing systems, which may include a single processor, single-core processor, multiple processors, a multicore processor, or any combination thereof.

Figure 10:
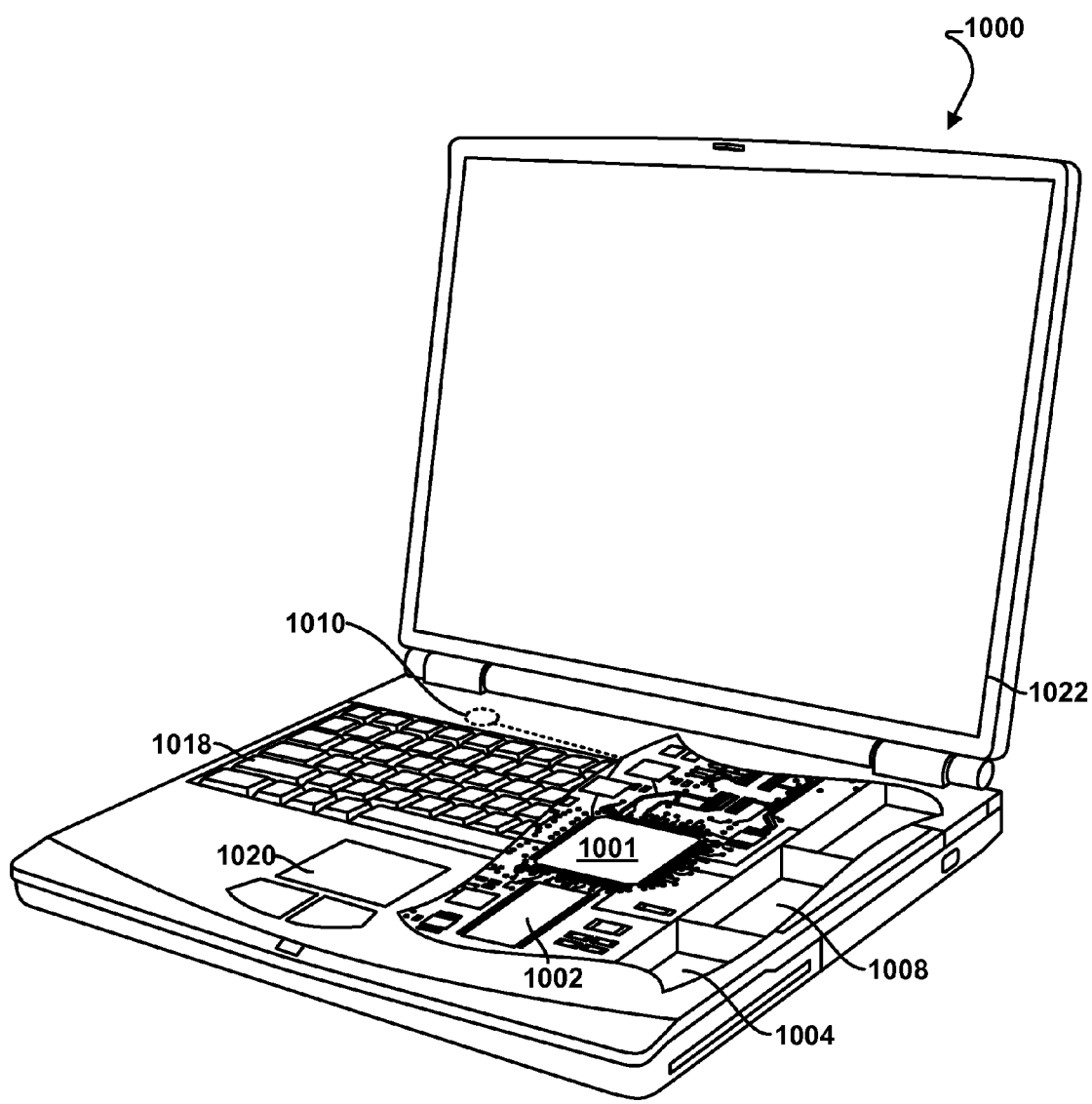
FIG. 10 is a block diagram of an example laptop computer suitable for use with the various embodiments.
Figure 11:
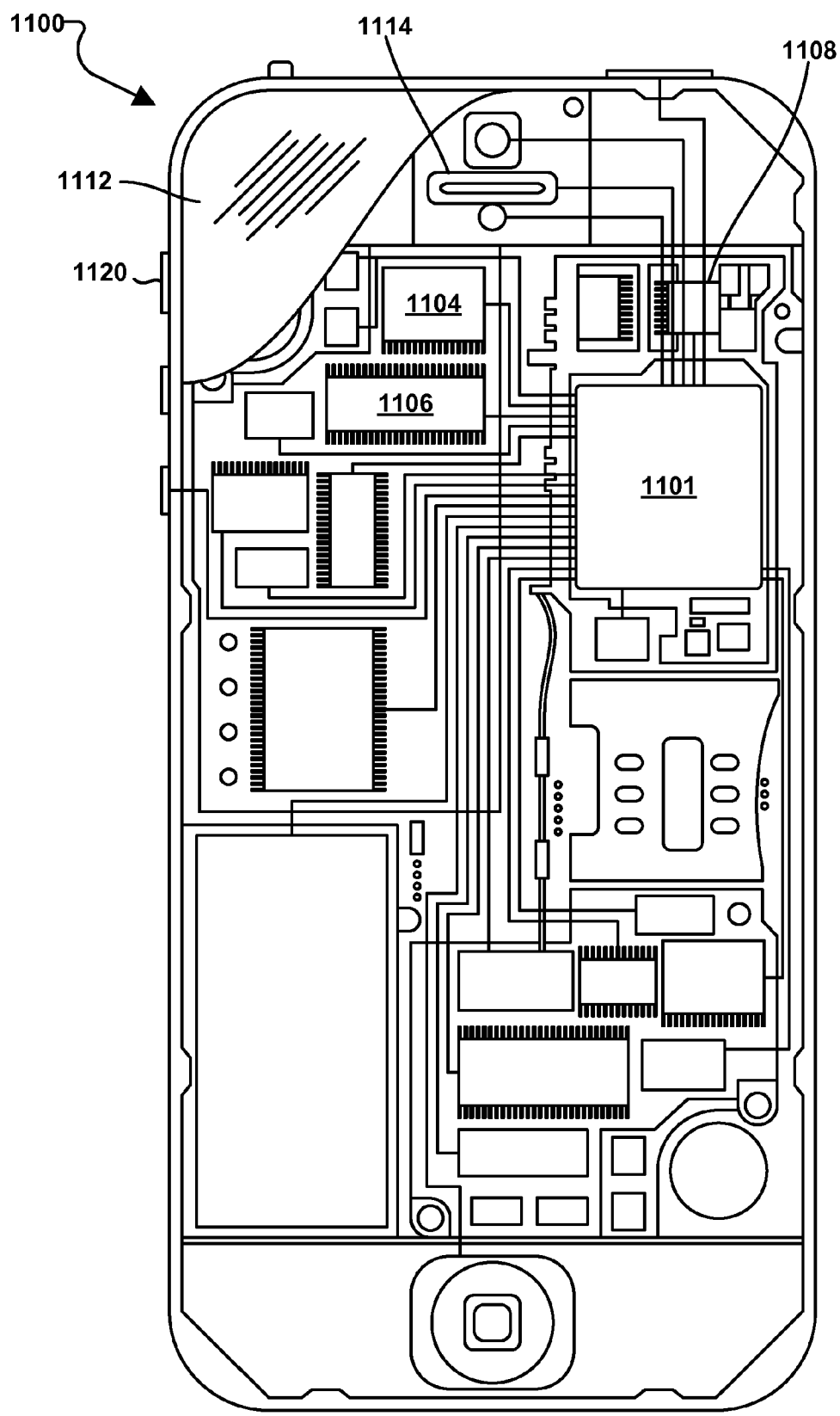
FIG. 11 is a block diagram of an example smartphone suitable for use with the various embodiments.
Figure 12:
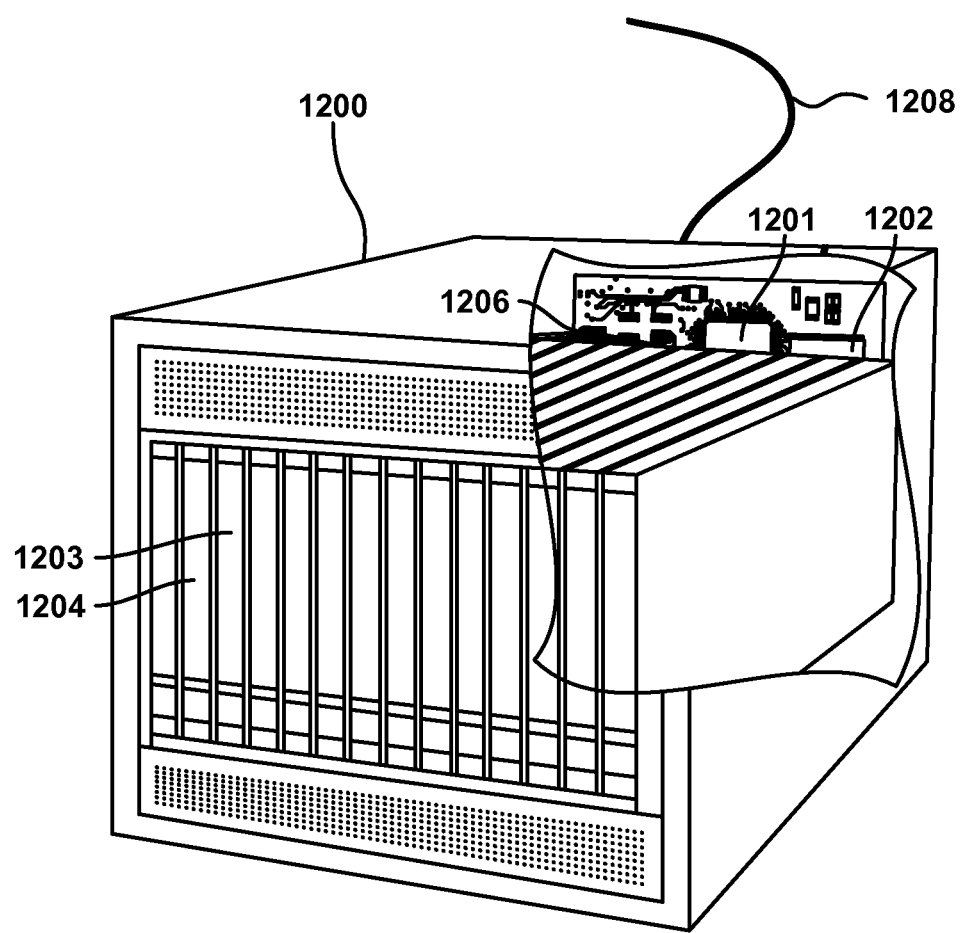
FIG. 12 is a block diagram of an example server computer suitable for use with the various embodiments.

The various embodiments (including but not limited to embodiments discussed above with respect to FIGS. 3-9, etc.) may be implemented on a variety of computing devices, examples of which are illustrated in FIGS. 10-12.

Computing devices will have in common the components illustrated in FIG. 10, which illustrates an example personal laptop computer 1000. Such a personal computer 1000 generally includes a multi-core processor 1001 coupled to volatile memory 1002 and a large capacity nonvolatile memory, such as a disk drive 1004. The computer 1000 may also include a compact disc (CD) and/or DVD drive 1008 coupled to the processor 1001. The personal laptop computer 1000 may also include a number of connector ports coupled to the processor 1001 for establishing data connections or receiving external memory devices, such as a network connection circuit for coupling the processor 1001 to a network. The personal laptop computer 1000 may have a radio/antenna 1010 for sending and receiving electromagnetic radiation that is connected to a wireless data link coupled to the processor 1001. The computer 1000 may further include keyboard 1018, a pointing a mouse pad 1020, and a display 1022 as is well known in the computer arts.

The multi-core processor 1001 may include circuits and structures similar to those described above and illustrated in FIG. 9.

FIG. 11 illustrates a smartphone 1100 that includes a multi-core processor 1101 coupled to internal memory 1104, a display 1112, and to a speaker 1114. Additionally, the smartphone 1100 may include an antenna for sending and receiving electromagnetic radiation that may be connected to a wireless data link and/or cellular telephone transceiver 1108 coupled to the processor 1101. Smartphones 1100 typically also include menu selection buttons or rocker switches 1120 for receiving user inputs. A typical smartphone 1100 also includes a sound encoding/decoding (CODEC) circuit 1106, which digitizes sound received from a microphone into data packets suitable for wireless transmission and decodes received sound data packets to generate analog signals that are provided to the speaker to generate sound. Also, one or more of the processor 1101, transceiver 1108 and CODEC 1106 may include a digital signal processor (DSP) circuit (not shown separately).

The various embodiments may also be implemented on any of a variety of commercially available server devices, such as the server 1200 illustrated in FIG. 12. Such a server 1200 typically includes multiple processor systems one or more of which may be or include a multi-core processor 1201. The processor 1201 may be coupled to volatile memory 1202 and a large capacity nonvolatile memory, such as a disk drive 1203. The server 1200 may also include a floppy disc drive, compact disc (CD) or DVD disc drive 1204 coupled to the processor 1201. The server 1200 may also include network access ports 1206 coupled to the processor 1201 for establishing data connections with a network 1208, such as a local area network coupled to other broadcast system computers and servers.

The processors 1001, 1101, 1201 may be any programmable multi-core multiprocessor, microcomputer or multiple processor chips that can be configured by software instructions (applications) to perform a variety of functions, including the functions and operations of the various embodiments described herein. Multiple processors may be provided, such as one processor dedicated to wireless communication functions and one processor dedicated to running other applications. Typically, application programs may be stored in the internal memory 1002, 1104, 1202 before they are accessed and loaded into the processor 1001, 1101, 1201. In some mobile computing devices, additional memory chips (e.g., a Secure Data (SD) card) may be plugged into the mobile device and coupled to the processor 1001, 1101, 1201. The internal memory 1002, 1104, 1202 may be a volatile or nonvolatile memory, such as flash memory, or a mixture of both. For the purposes of this description, a general reference to memory refers to all memory accessible by the processor 1001, 1101, 1201, including internal memory, removable memory plugged into the mobile device, and memory within the processor 1001, 1101, 1201 itself.

Computer program code or "code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein refer to machine language code (such as object code) whose format is understandable by a processor.

Computing devices may include an operating system kernel that is organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components discussed in this application may be implemented in either the kernel space or the user space, unless expressly stated otherwise.

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core, and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of executing tasks in a computing device, comprising:

identifying a sequence of tasks via a task dependency controller of the computing device;

identifying tasks in the sequence of tasks that depend on one predecessor task, have one dependent successor task, or both;

adding a record to a hardware-based table for each of the identified tasks, each record including a predecessor task parameter, a successor task parameter, and a successor program counter parameter, the successor program counter parameter including a value identifying a starting instruction of the one dependent successor task;

receiving an indication to commence execution of a first task in the sequence of tasks;

in response to the indication, checking the hardware-based table for the corresponding entry associated with the first task;

determining whether any predecessor task identified by the predecessor task parameter stored in the corresponding entry has completed execution;

based on the determination regarding the predecessor task stored in the corresponding entry, commencing execution of the first task;

after execution of the first task, incrementing a value of the successor program counter parameter to an address stored in the successor task parameter;

after the incrementing, executing a successor task identified by the successor task parameter and each remaining dependent successor task in the sequence of tasks without transferring control to a runtime system.

2. The method of claim 1, wherein identifying the sequence of tasks via the task dependency controller of the computing device comprises identifying the sequence of tasks via a hardware-based task dependency controller.

3. The method of claim 2, wherein the hardware-based task dependency controller is a hardware component shared among a plurality of processor cores executing the sequence of tasks.

4. The method of claim 1, wherein adding the record to the hardware-based table for each of the identified tasks comprises the task dependency controller adding the record to a map structure for each of the identified tasks.

5. The method of claim 4, wherein the task dependency controller adding the record to the map structure for each of the identified tasks comprises the task dependency controller adding the record to one of an associative map structure and a direct map structure for each of the identified tasks.

6. A computing device, comprising:
a processor configured with processor-executable instructions to perform operations comprising:
identifying a sequence of tasks via a task dependency controller;
identifying tasks in the sequence of tasks that depend on one predecessor task, have one dependent successor task, or both;
adding a record to a hardware-based table for each of the identified tasks, each record including a predecessor task parameter, a successor task parameter, and a successor program counter parameter, the successor program counter parameter including a value identifying a starting instruction of the one dependent successor task;
receiving an indication to commence execution of a first task in the sequence of tasks;
in response to the indication, checking the hardware-based table for the corresponding entry associated with the first task;
determining whether any predecessor task identified by the predecessor task parameter stored in the corresponding entry has completed execution;
based on the determination regarding the predecessor task stored in the corresponding entry, commencing execution of the first task;
after execution of the first task, incrementing a value of the successor program counter parameter to an address stored in the successor task parameter;
after the incrementing, executing a successor task identified by the successor task parameter and each remaining dependent successor task in the sequence of tasks without transferring control to a runtime system.

7. The computing device of claim 6, further comprising a hardware-based task dependency controller, wherein identifying the sequence of tasks via the task dependency controller comprises identifying the sequence of tasks via the hardware-based task dependency controller.

8. The computing device of claim 7, further comprising a plurality of processor cores, wherein the hardware-based task dependency controller is shared among the plurality of processor cores executing the sequence of tasks.

9. The computing device of claim 6, wherein the processor is configured with processor-executable instructions such that comprises causing the task dependency controller to add the record to a map structure selected from a group including an associative map structure and a direct map structure.

10. A non-transitory computer readable storage medium having stored thereon processor-executable software instructions configured to cause a computing device processor to perform operations comprising:
identifying a sequence of tasks via a task dependency controller;
identifying tasks in the sequence of tasks that depend on one predecessor task, have one dependent successor task, or both;
adding a record to a hardware-based table for each of the identified tasks, each record including a predecessor task parameter, a successor task parameter, and a successor program counter parameter, the successor program counter parameter including a value identifying a starting instruction of the one dependent successor task;
receiving an indication to commence execution of a first task in the sequence of tasks;
in response to the indication, checking the hardware-based table for the corresponding entry associated with the first task;
determining whether any predecessor task identified by the predecessor task parameter stored in the corresponding entry has completed execution;
based on the determination regarding the predecessor task stored in the corresponding entry, commencing execution of the first task;
after execution of the first task, incrementing a value of the successor program counter parameter to an address stored in the successor task parameter;
after the incrementing, executing a successor task identified by the successor task parameter and each remaining dependent successor task in the sequence of tasks without transferring control to a runtime system.

11. The non-transitory computer readable storage medium of claim 10, wherein the stored processor-executable software instructions are configured to cause a processor to perform operations such that identifying the sequence of tasks via the task dependency controller comprises identifying the sequence of tasks via a hardware-based task dependency controller.

12. The non-transitory computer readable storage medium of claim 11, wherein the stored processor-executable software instructions are configured to cause a processor to perform operations such that identifying the sequence of tasks via the hardware-based task dependency controller comprises identifying the sequence of tasks via a hardware component shared by a plurality of processor cores executing the sequence of tasks.

13. The non-transitory computer readable storage medium of claim 10, wherein the stored processor-executable software instructions are configured to cause a processor to perform operations such that comprises adding the record to one of an associative map structure and a direct map structure.

14. A computing device, comprising:
   means for identifying a sequence of tasks via a task dependency controller;
   means for identifying tasks in the sequence of tasks that depend on one predecessor task, have one dependent successor task, or both;
   means for adding a record to a hardware-based table for each of the identified tasks, each record including a predecessor task parameter, a successor task parameter, and a successor program counter parameter, the successor program counter parameter including a value identifying a starting instruction of the one dependent successor task;
   means for receiving an indication to commence execution of a first task in the sequence of tasks;
   means for checking, in response to the indication, the hardware-based table for the corresponding entry associated with the first task;
   means for determining whether any predecessor task identified by the predecessor task parameter stored in the corresponding entry has completed execution;
   means for commencing execution of the first task based on the determination regarding the predecessor task stored in the corresponding entry;
   means for incrementing, after execution of the first task, a value of the successor program counter parameter to an address stored in the successor task parameter;
   means for executing, executing a successor task identified by the successor task parameter and each remaining dependent successor task in the sequence of tasks without transferring control to a runtime system.

15. The computing device of claim 14, wherein means for identifying the sequence of tasks via the task dependency controller comprises means for identifying the sequence of tasks via a hardware-based task dependency controller.

16. The computing device of claim 15, wherein means for identifying the sequence of tasks via the hardware-based task dependency controller comprises means for identifying the sequence of tasks via a hardware component that is shared by a plurality of processor cores that execute the sequence of tasks.

17. The computing device of claim 14, wherein means for adding the record to the hardware-based table for each of the identified tasks comprises means for adding record to a map structure for each of the identified tasks.

18. The computing device of claim 17, wherein means for adding the record to the map structure comprises means for adding the record to one of an associative map structure and a direct map structure for each of the identified tasks.

* * * * *